Jan. 11, 1944.   B. LANDEN   2,339,018
DRAW BAR FOR HARROWS
Filed Aug. 29, 1941
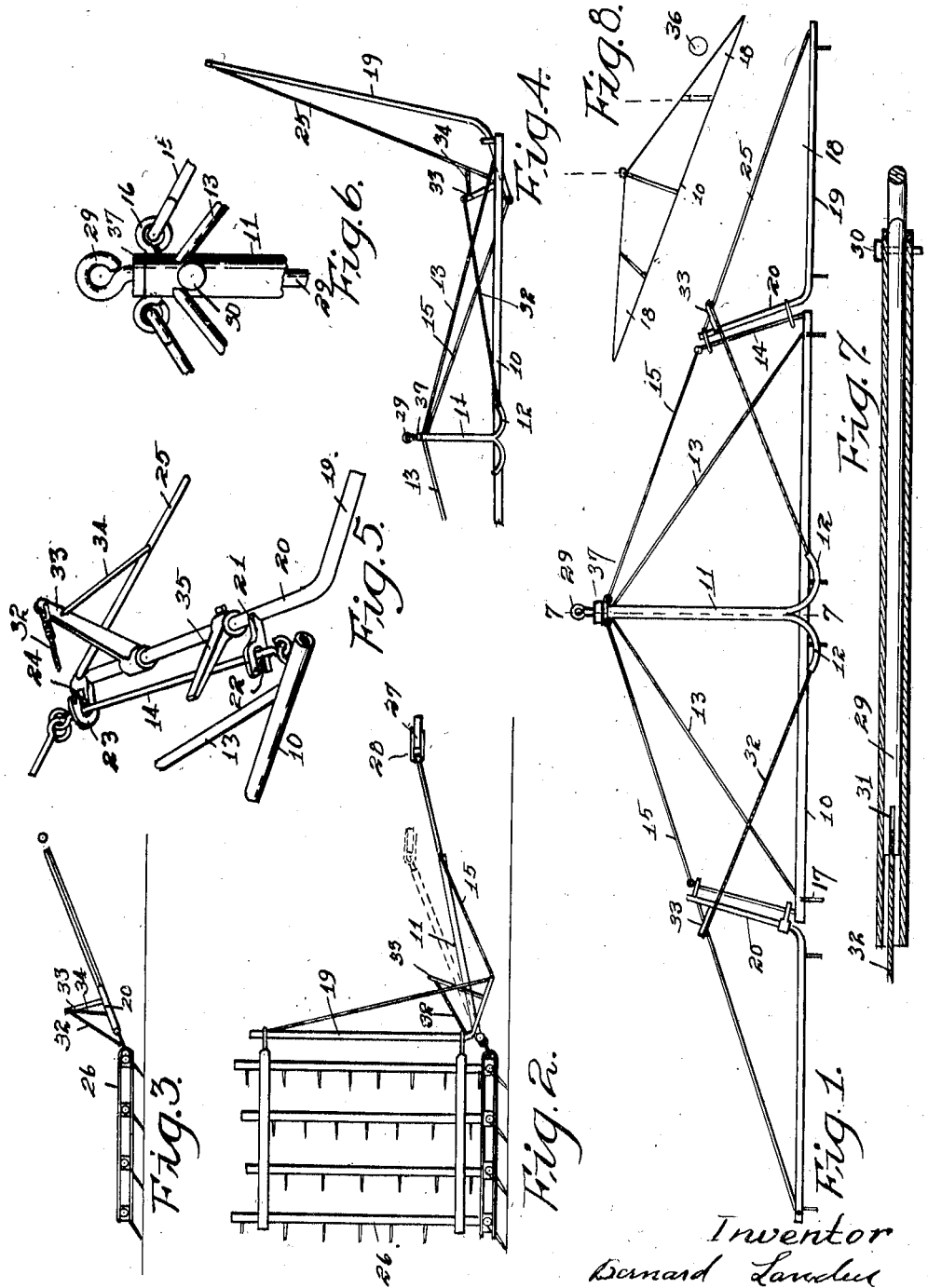
Inventor
Bernard Landen
by Owing & Heague
Attys Patented Jan. 11, 1944

2,339,018

UNITED STATES PATENT OFFICE 2,339,018

DRAWBAR FOR HARROWS

Bernard Landen, Ida Grove, Iowa

Application August 29, 1941, Serial No. 408,691

4 Claims. (Cl. 55—84)

The object of my invention is to provide an improved draw bar for harrows of the type employing a central section and two end sections, wherein the end sections may be folded to permit the draw bar and the harrow sections attached thereto to pass through a gate narrower than the combined length of the draw bar sections, and in connection therewith, means whereby the power applied to the central section for advancing the same over the ground surface may be utilized to elevate the end sections from a horizontal position to substantiailly a vertical position, wherein a boy or small person operating the tractor may easily fold the end sections to their upright positions without the assistance of a man or strong person.

A further object of my invention is to provide in a draw bar for harrows of the type above described, an improved hinge construction for connecting the end sections to the central section, wherein the end sections will automatically fold to upwardly inclined or upright positions when either one of the said end sections engages an obstruction such as a post or rock.

A further object of my invention is to provide a draw bar for harrows capable of accomplishing the above mentioned results, of comparatively cheap construction and light weight, the draw bar sections being formed preferably of fabricated structural steel.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a plan view of my improved draw bar;

Figure 2 is an end elevation of the same illustrating one of the end sections in an elevated or folded position;

Figure 3 is an end view of the draw bar showing the manner in which it is connected to a harrow section in an operative position;

Figure 4 is a rear view of the central portion and one end of the draw bar with one of the end sections in an elevated position;

Figure 5 is a perspective view illustrating the hinging means for connecting the end sections to the central section;

Figure 6 is an enlarged detail plan view of the forward end of the draft device of the draw bar showing the manner in which the braces are connected thereto;

Figure 7 is an enlarged detail sectional view taken on the line 7—7 of Figure 1; and Figure 8 is a diagrammatical view of my improved draw bar illustrating the position that it would assume by engaging an obstruction.

My improved draw bar comprises what I shall term a draft bar 10, preferably of tubular formation, having connected to its central portion a tubular guide 11, the rear end of the guide 11 terminating in curved tubular portions 12 which are secured to the member 10, preferably by welding. Braces 13 extend from the forward end of the member to a point near the ends of the member 10, said members 13 being permanently fixed to the members 10 and 11 by welding so that a triangular and rigid frame is thus formed.

Pivotally mounted to each end of the tubular member 10 is what I shall term a pivot member 14 serving as a brace bar and also as a pivot, in the manner hereinafter described.

Pivotally connected to the forward end of each of the members 14 is a brace bar 15, said brace bar 15 also being pivotally connected to eyelets 16 secured to the forward end of the guide 11, the members 15 being of such length that the members 14 incline inwardly and forwardly from their points of attachment with the draft bar 10, as clearly illustrated in Figure 1. The draft bar 10 is preferably of a length to accommodate two harrow sections which may be connected thereto by means of any desired means, such as hooks 17.

The frame member and the brace rods above described constitute what I shall term the central draw bar section. Hingedly connected to each of the members 14 is a draw bar end section 18, each section comprising preferably a tubular draft bar 19 normally supported in alignment with the draft bar 10, each of the members 19 having its inner end curved inwardly and forwardly to form what I shall term a torsional tube 20, said member 20 being of a length substantially equal to the length of the rods 14 and supported substantially parallel thereto and detachably and operatively connected to said rods 14 by means of a bifurcated hinge member 21 fixed to and near the end of the member 20 and adapted to straddle the member 14, as illustrated in Figure 5, a latch 22 being provided for holding the member 21 in position. The forward end of each of the members 20 is provided with a hook 23 for also receiving the member 14, said hook having a latch device 24 for retaining the same in operative position. Said latch devices 22 and 24 provide means whereby the section 18 may be easily and quickly removed or attached when so desired.

A brace bar 25 connects the forward end of the member 20 with the outer end of the member 19. Thus means is provided whereby the outer ends of the section 18 are free to swing upwardly from a horizontal position to substantially an upright position, to permit the draw bar to pass through gates.

It will be seen from the above described construction that the draw bar comprises a central section and two end sections, each section being formed of fabricated structural steel and provided with a brace extending from the outer ends of the members 19 to the forward end of the guide 11, said braces consisting of the members 15 and 25, thus providing means for rigidly supporting the outer ends of the bars 18 against rearward movement as power is applied to the forward end of the guide 11. It will further be seen that all three of the sections are supported in an inclined plane between the forward edges of the harrow sections 26 and the forward end of the member 11, the forward end of the member 11 being attached to a power device 27 by means of a suitable clevis 28 and an eye bolt 29, said eye bolt being slidably mounted in the member 11 and held against sliding movement by means of a pin 30 passing through the guide 11 and the bolt 29. The inner end of the bolt 29 is provided with a slot 31 for receiving one end of a pair of cables 32 which are designed to be threaded through the curved tubular members 12 and each connected to one end of a lever 33 which is fixed to and mounted on the torsional shaft 20, the lever 33 being provided with a brace 34 extending to the brace 25 in such a manner that if the outer ends of the arms 33 are moved inwardly, the outer ends of the sections 18 will be swung upwardly to their upright positions. This folding movement is accomplished by power derived from the bar 27 by simply removing the pin 30 from the members 11 and 29, then moving the bar 27 forwardly, causing the rod 29 to slide forwardly in the guide 11 and to pull the inner ends of the cables 32 through the tubular members 12. An arm 35 is also fixed to the member 20 and adapted to engage the member 14 (see Fig. 5) at the time the sections 18 are elevated to substantially the upright position, illustrated in Figure 4, thus providing means for automatically elevating the end sections from power derived from a tractor or other power source applied to the bar 27. As power is applied to the cables 32 for elevating the end sections 18 after the pin 30 has been removed from the members 11 and 29, the forward ends of the members 20 will be forced downwardly in the manner illustrated in Figs. 2 and 4, permitting the members 19 to be moved to substantially upright positions as viewed from the end and as illustrated in Fig. 2, permitting the inner end of the elevated harrow section 26 to be supported substantially parallel with the ground surface.

The operation of my improved draw bar is as follows:

Assuming that the pin 30 is inserted in operative position and that the draw bar is connected to the harrow section 26 and that the eyelet 29 is connected to a suitable power device, such as a farm tractor, and that the said tractor is advanced over the ground surface and during the time of advancement of the brace bar 25 one of the end sections would engage an obstruction 36, such as a fence post, stump or rock, then it will be seen that the corresponding end of the draw bar will tend to swing rearwardly, permitting the draw bar to assume an inclined position relative to its line of advance, as illustrated in Figure 8, and that one of the pivot rods 14 will then be substantially in alignment with the line of advance. It will also be seen that the rod 25 will engage the obstruction at a point higher than the bar 19, so that the said rod engages the obstruction obliquely, both from horizontal and vertical positions, which tends to cause the engaged end of the section 18 to be elevated and slide upwardly and along the obstruction, permitting the section to be elevated and pass the obstruction without injury to the draw bar or the harrow sections. In this connection it will be seen that by inclining the pivot members forwardly and inwardly when the draft bar is in its normal position, the said pivot members will assume positions substantially parallel with the line of advance when the draw bar is inclined by engaging an object, further facilitating and permitting the free end of the sections 18 to move upwardly. This is the reason for inclining the pivot members 14.

It will further be seen that this feature is adapted to draw bars even if the automatic and power operated means were eliminated. It will further be seen that the lever arm 33 and the cables 32 and the lug 37 applied to the rod 29 provide means for supporting the free ends of the sections 18 against excessive downward movement in case one of the end sections should extend beyond the bank of a creek or ditch, in which the said end section will be supported preferably in a slightly downwardly and outwardly inclined position without injury to the section, the draft bar being so adjusted that the outer ends of the end sections will swing down somewhat below the horizontal to permit the end sections to follow the contour of uneven ground surfaces.

Assuming that the operator desired to pass through a gate which is narrower than the combined length of all of the sections, then he simply removes the pin 30 and permits the tractor to advance, which in turn will cause the rod 29 to slide relative to the guide 11 and the cables 32 to be drawn inwardly and the upper ends of the levers to be moved inwardly, and in turn the sections 18 are elevated until the members 35 engage the brace member 13, which is the time before the sections 18 reach the vertical position, so that the sections will automatically drop to their horizontal normal positions by simply permitting the tractor power means to move rearwardly, allowing the rod 29 to be drawn into the guide 11.

It will readily be seen that rollers might be substituted for the curved tubular members 12 without departing from the spirit of my invention.

Thus it will be seen I have provided an improved draw bar for harrows wherein the end sections may be elevated to their folded positions by power derived from the power means and wherein the end sections will automatically slide over and past obstructions engaged by said sections.

I claim as my invention:

1. A draw bar for harrows, comprising a central section and end sections, means hinging the end sections to the central section, means for operatively connecting the central section to a suitable power means, including a hitch device capable of forward and rearward movement relative to said draw bar, means actuated by the relative movement of said hitch device for causing the free ends of said end sections to be elevated from a horizontal position to substantially a vertical position, and means for attaching to each draw bar section a harrow section or sections.

2. A draw bar for harrows, comprising a central section and end sections, the central section comprising a draft bar, a tubular guide supported forwardly of its central portion and at right angles thereto, a brace rod from the forward end of said guide to each of the ends of said draft bar, a forwardly and inwardly extending link pivoted to each end of said draft bar, a link having one end pivotally connected to the forward end of each of the last links and the other end connected to the forward end of said guide, each end section comprising a draft bar having at its inner end a forwardly and inwardly extending torsional rod substantially parallel with the corresponding one of said first links, hooks detachably connecting said torsional rod to the corresponding links, a brace from the forward end of each torsional rod to the outer end of the corresponding draft bar, a lever arm on each torsional rod, a slide bar mounted in said guide, and a cable for linking the inner end of said slide bar to each of said lever arms, wherein forward movement of said slide bar relative to said guide will cause said torsional rod to rock and the outer ends of said sections to be elevated.

3. A draw bar for harrows comprising a central section and an end section, a rear member for each of said two sections adapted for attachment with a harrow, means for securing said central section to a power means, with the width of said draw bar being such that the draw bar is normally supported from said power means in an upwardly and forwardly inclined plane from the point of attachment of said rear members with said harrows, means pivotally connecting together said two sections, with said connecting means being inclined inwardly from said rear members, and a front member for said end section extended outwardly and rearwardly from said connecting means, said end section, on the striking of an obstruction by said front member, being pivoted upwardly and inwardly toward said central section to clear said obstruction.

4. In a draw bar for harrows having a central section and an end section, a rear member for each of said sections, means providing for said end section folding upwardly and inwardly toward said central section when said end section strikes an obstruction including means for supporting said draw bar from a power unit in a rearwardly and downwardly extended plane, an end member for said end section inclined inwardly and forwardly from said end section rear member, an end member for said central section inclined inwardly and forwardly from said central section rear member, means pivotally connecting said two sections together so that said two end members are adjacent to each other and in parallel alignment, and a front member for said end section extended rearwardly and outwardly from the end member of said end section.

BERNARD LANDEN.